US008457612B1

United States Patent
Daniell

(10) Patent No.: US 8,457,612 B1
(45) Date of Patent: Jun. 4, 2013

(54) PROVIDING LOCATION-BASED MULTIMEDIA MESSAGES TO A MOBILE DEVICE

(75) Inventor: William Todd Daniell, Kennesaw, GA (US)

(73) Assignee: The Weather Channel, LLC, Atlanta, GA (US)

( * ) Notice: Subject to any disclaimer, the term of this patent is extended or adjusted under 35 U.S.C. 154(b) by 302 days.

(21) Appl. No.: 12/759,895

(22) Filed: Apr. 14, 2010
(Under 37 CFR 1.47)

Related U.S. Application Data

(60) Provisional application No. 61/169,306, filed on Apr. 14, 2009.

(51) Int. Cl.
*H04L 29/08108* (2006.01)
*H04L 29/08756* (2006.01)
*H04L 12/5895* (2006.01)
*H04W 4/12* (2009.01)
*H04M 1/72522* (2006.01)

(52) U.S. Cl.
USPC .............. 455/414.4; 455/404.1; 455/404.2; 455/414.3; 455/456.1; 455/466; 455/456.3; 709/206

(58) Field of Classification Search
USPC .......... 455/414.4, 404.2, 456.1, 466; 709/206
See application file for complete search history.

(56) References Cited

U.S. PATENT DOCUMENTS

| | | | |
|---|---|---|---|
| 7,275,089 B1 * | 9/2007 | Marshall et al. | 709/219 |
| 2005/0009508 A1 * | 1/2005 | Graske et al. | 455/414.3 |
| 2005/0227672 A1 * | 10/2005 | Lauzon et al. | 455/412.2 |
| 2005/0266863 A1 * | 12/2005 | Benco et al. | 455/466 |
| 2006/0142024 A1 * | 6/2006 | Thalanany et al. | 455/456.1 |
| 2006/0217982 A1 * | 9/2006 | Munro | 704/260 |
| 2007/0049260 A1 * | 3/2007 | Yuhara et al. | 455/414.3 |
| 2007/0072583 A1 * | 3/2007 | Barbeau et al. | 455/404.2 |
| 2007/0202886 A1 * | 8/2007 | Dhebri et al. | 455/456.1 |
| 2009/0137222 A1 * | 5/2009 | Heen | 455/404.1 |
| 2010/0076767 A1 * | 3/2010 | Vieri et al. | 704/260 |
| 2011/0248863 A1 * | 10/2011 | Johnson et al. | 340/686.1 |
| 2011/0270940 A1 * | 11/2011 | Johnson et al. | 709/207 |

* cited by examiner

*Primary Examiner* — Allahyar Kasraian
(74) *Attorney, Agent, or Firm* — Meunier Carlin & Curfman, LLC

(57) ABSTRACT

Systems and methods for providing multimedia content to mobile devices within a geographic area. A services provider may track locations of mobile devices in a location database. Geographically coded information may be received by the services provider from which a lookup may be performed of the location database to determine which mobile devices are in a geographic region associated with the geographically coded information. The geographically coded information may be forwarded as an SMS message to the mobile device, which may then convert the SMS message to a multimedia format for playback on the device, or may request that the services provider convert the SMS message to a multimedia format for playback on the mobile device.

18 Claims, 5 Drawing Sheets

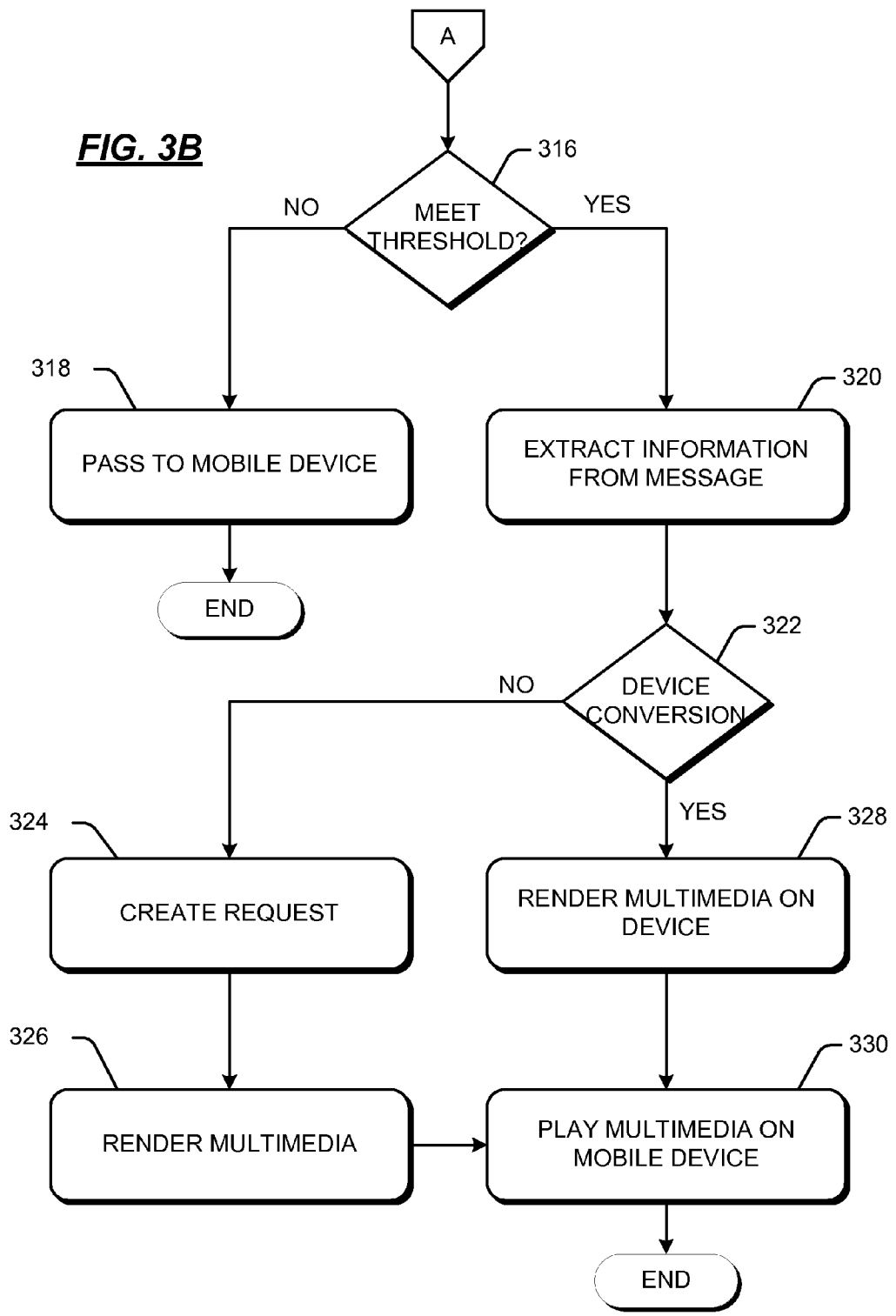

PROVIDING LOCATION-BASED MULTIMEDIA MESSAGES TO A MOBILE DEVICE

CROSS-REFERENCE TO RELATED APPLICATION

The present application claims priority to U.S. Provisional Patent Application Ser. No. 61/169,306, entitled "Providing Location-Based Multimedia Messages to a Mobile Device", filed on Apr. 14, 2009, the contents of which are hereby incorporated by reference in their entirety.

BACKGROUND

Weather information has traditionally been accessible through media such as radio, television and newspapers. However, these outlets often do not provide timely information to users or are not available to users when time-sensitive or location-sensitive information needs to be communicated.

SUMMARY

A large percentage of individuals are mobile phone users. Provided herein are systems and methods to utilize the mobile phone as a delivery mechanism of multimedia messages, such as early warning messages of impending severe weather. Using the capability of mobile phones to determine a location, severe warning messages may be converted to multimedia format and communicated to the mobile devices. Thus, mobile devices may be used as verbal and/or textual severe weather early warning devices because they are location aware. The systems and methods may support mobile phones, smart phones, and other portable computing devices that can obtain a location, has access to a network, and has the capability to render a digital audio to the user. In some implementations, other location or time sensitive information may be communicated to the mobile device, such as advertising, marketing information or points of interest information in a multimedia format where the mobile device subscribes to services to provide such information.

In some implementations, a method of providing a location-based multimedia message to a mobile device is described. The method may include tracking a geographic location of the mobile device in a location database; receiving information at a mobile web services interface having a geographic identifier from an external source; querying the location database for mobile devices within the geographic location associated with the geographic identifier of the information; and communicating, from a messaging server, the location-based multimedia message to the mobile devices in the geographic location.

In some implementations, a method of providing a multimedia message on a mobile device may include instantiating an application on the mobile device that provides geographic location information to a service provider; receiving an SMS message containing location-based information targeted to mobile devices in a particular geographic region; examining the SMS message to determine if a short code meets a predetermined threshold; and providing, at the mobile device, the location-based information in the SMS message as the multimedia message.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

FIGS. 3A and 3B are operational flow charts depicting exemplary processes performed within the environment of FIG. 1.

DETAILED DESCRIPTION

Figure 1:
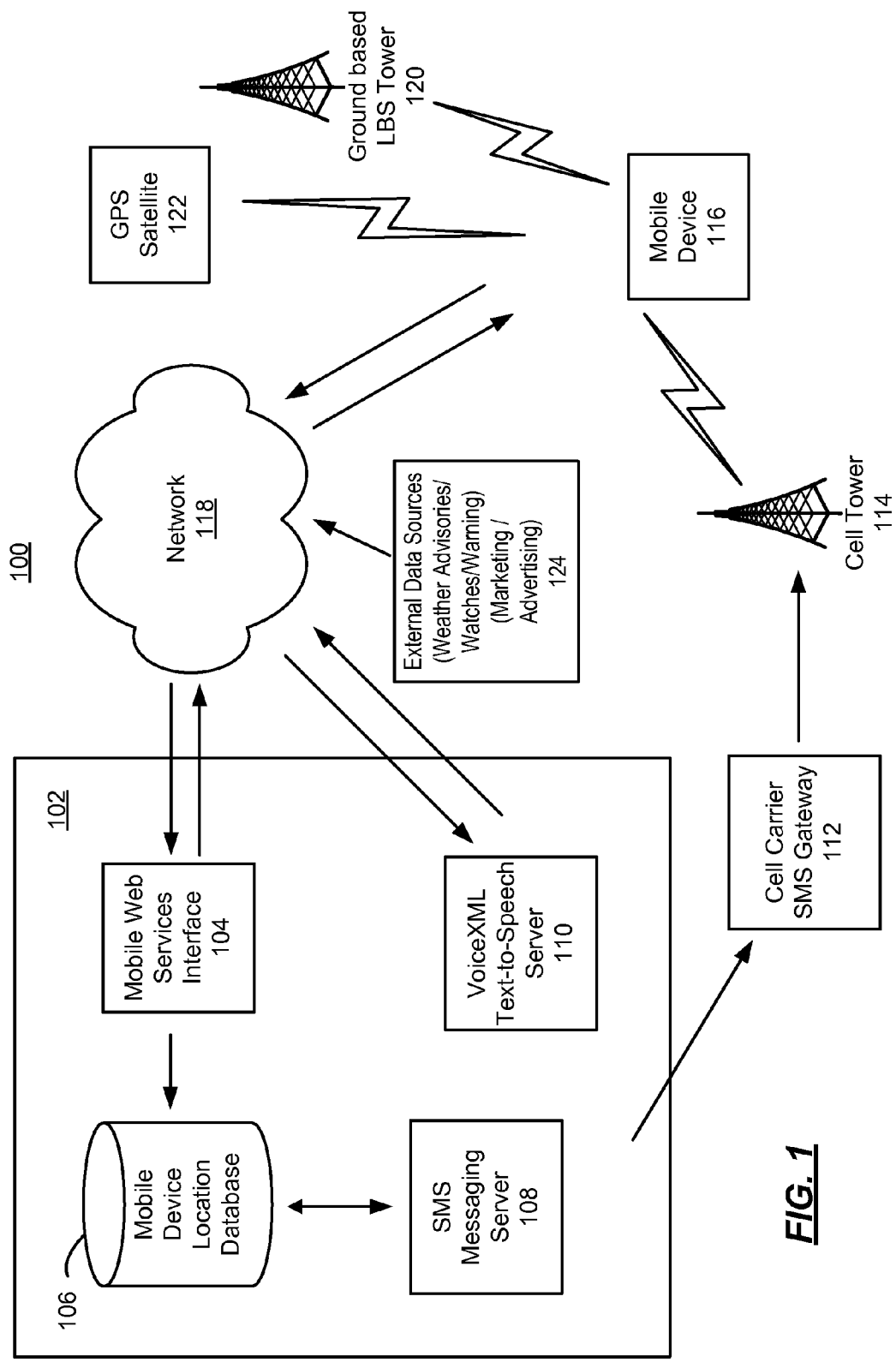
FIG. 1 illustrates an exemplary environment for providing location-based multimedia content to a mobile device.

FIG. 1 illustrates an exemplary environment 100 for providing location-based multimedia content to a mobile device. In some implementations, the environment 100 may be used to provide severe weather alerts to a mobile device based on a location of the mobile device. In other implementations, location-specific marketing or advertising may be provided to the mobile device. In yet other implementations, multimedia content may be delivered to service subscribers' mobile devices based on predetermine subscription criteria.

As shown in FIG. 1, a service provider 102 may have a mobile web services interface 104, a mobile device location database 106, an SMS messaging server 108 and a VoiceXML text-to-speech server 110. The mobile web services interface 104 may be one or more servers that provide an interface to web services provided by the service provider 102. The mobile web services interface 104 is typically placed behind one or more firewalls and a proxy gateway. The mobile web services interface 104 provides access to back-end applications and servers on a private network of the service provider 102.

Web services are typically deployed on application servers that may use business-logic-layer software components in a multi-tier software architecture to provide computation and data access functions. Web services can interact with other web services distributed across the internet, as well as server-side components implemented as classes (e.g., Enterprise Java Bean or Microsoft COM components) within the same enterprise network (e.g., within the service provider 102).

The mobile web services interface 104 may provide a broad range of functions including notification services. Notification services provide data subscription and delivery mechanisms. Applications that use notification services can provide users with the needed information any time, allowing them to make timely and informed decisions. Users may subscribe to these services by specifying triggering events for generating and sending notifications. Notifications may be sent to the mobile device 116 as SMS (Short Message Service) message or to an email account, etc. The service provider 102 may offer one or more notifications services. For example, the service provider 102 may offer a severe weather alerting service that provides location-specific multimedia severe weather alerts to a mobile device 116 based on determined location of the mobile device 116.

A mobile device location database 106 may store locations of mobile devices 116 that subscribe to services offered by the service provider. In some implementations, as described below, an application on the mobile device 116 may periodically report the position of the global device 116 to the mobile device location database 106 as latitude/longitude coordinates. The mobile device 116 may determine its position using GPS satellite(s) 122, a ground-based location-based service (LBS) tower 120, or other geo-location technique. In some implementations, the mobile device location database 106 may convert the latitude/longitude coordinates into a second geographic identifier, such as city/state, county/state, zip code, etc. The latitude/longitude coordinates and/or second geographic identifier may be stored in the mobile device location database 106 correlated to an identifier of the mobile device 116. The identify the mobile device may be a telephone number, international mobile equipment identity (IMEI) number, or other unique identifier of the mobile device 116.

An SMS messaging server 108 is a server that may be a messaging framework that sends, receives and/or processes SMS and e-mail messages. The messaging framework may support low- and high volume SMS and e-mail messaging. The SMS messaging server 108 may using GSM/GPRS modems, or by using the short message peer-to-peer protocol (SMPP) or hypertext transfer protocol (HTTP). The SMS messaging server 108 may communicate an appropriate cell carrier SMS gateway 112 associated with the network provider of the mobile device 116. The SMS gateway 112 may communicate to the mobile device 116 over one or more cell towers 114 associated with the network provider (e.g., AT&T, Verizon Wireless, Sprint, etc.) of the mobile device 116.

A VoiceXML text-to-speech server 110 is a server that uses Voice Extensible Markup Language (Voice XML) to express automated voice (audio) services using a markup language. The VoiceXML text-to-speech server 110 receives XML formatted voice from the mobile device 116 as a request and converts the XML formatted voice information to an audio file, such as a WAV, MP3, WMA file. The audio file is communicated to the mobile device 116 and may be played by an application running on the mobile device. The audio file may be in a language specified by the mobile device 116 or by user or system preference. For example, a localization setting of the mobile device 116 may be used to determine the language to be used in the audio file. Other preferences may be set, such as the gender of the voice used in the audio file, the cadence of the speech, etc. In addition, the voice used in the audio filed may be changed based on the type of message to be played on the mobile device 116. The VoiceXML text-to-speech server 110 is available from Cepstral LLC of Pittsburgh, Pa.

The network 118 may be any communications network, including the Internet and mobile networks, such as GPRS, EDGE and WCDMA. The network may include a WAP Gateway that serves as proxy or a service enabler located in the service layer, between the Internet and mobile networks. The service layer may include other service enablers for internet mobile applications, such as charging systems and mobile positioning systems. The WAP protocol runs like a tunnel from the mobile via radio communications towards the connectivity layer, the control layer and finally the service layer. WAP protocols are mobile network independent and work on top of different mobile networks such as GPRS, EDGE and WCDMA. WAP protocols are binary-based protocols and web servers do not support WAP protocols, thus the WAP gateway operates as a protocol converter between WAP protocols and common HTTP/TCP used by web servers on the Internet, such as the mobile web services interface 104.

External data sources 124 may be communicatively coupled the service provider 102 through the network 118. The external data sources 124 may include weather databases of weather information for various locations. The weather information may be observed weather data collected at various geographic locations. The weather information may also comprise weather forecast data. The weather data may be collected from various sources, such as the National Weather Service and may comprise advisories, watches and warnings for specific locations (e.g., a county, city, zip code, observation station, etc.). A location identifier may be associated with the weather information, such as latitude and longitude coordinates, county name, city name, zip code, observation station identifier, etc. The weather information may be communicated by the service provider 102 to the mobile devices 116 in accordance with FIGS. 3A and 3B.

The external data sources 124 may include marketing or advertising associated with particular locations. For example, geographically coded advertising may be provided to the service provider 102 for communication to mobile devices 116 that subscribe to services. Other items of interest may be included in the external data sources 124, such as historic sites, parks and recreation areas, sporting venues, etc. Similarly, this information may be geographically coded and communicated to mobile devices 116 that subscribe to services.

Figure 2:
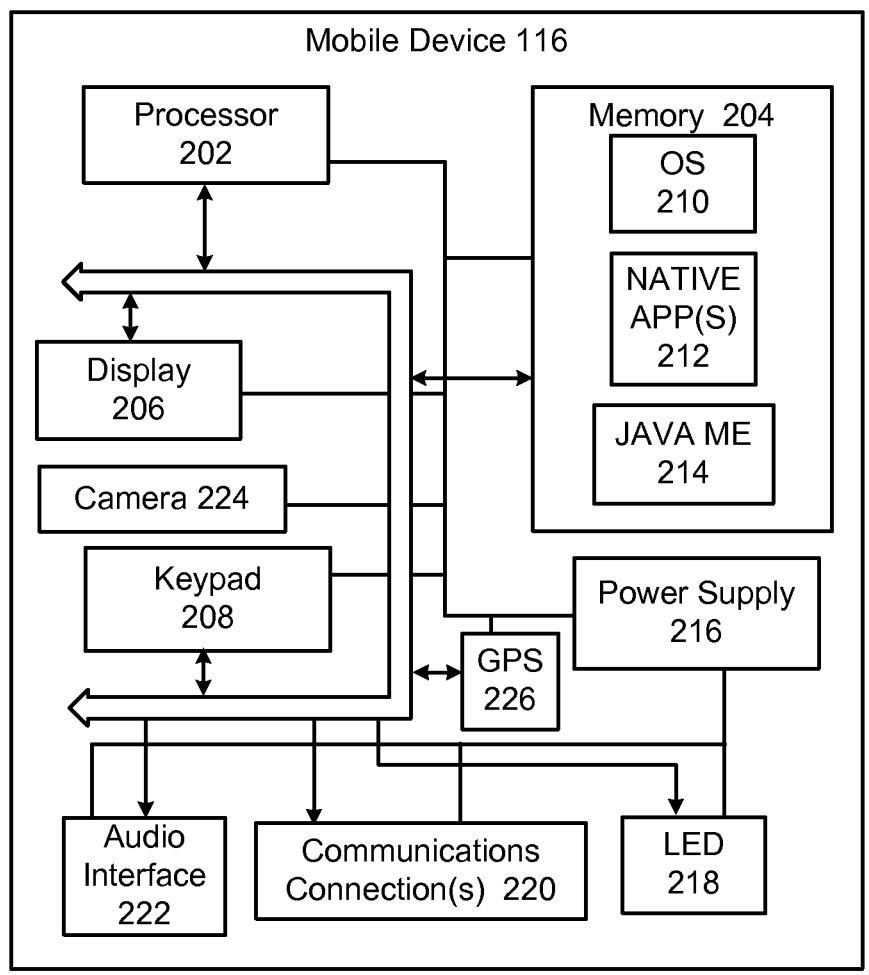
FIG. 2 illustrates a mobile device in greater detail.

The mobile device 116 may be configured in many different ways. For example, the mobile device 116 may be a mobile phone, a PDA, a mobile computer, and the like. FIG. 2 illustrates the mobile device 116 in greater detail. The mobile device 116 may includes a processor 202, a memory 204, a display 206, and a keypad 208. The memory 204 generally includes both volatile memory (e.g., RAM) and non-volatile memory (e.g., ROM, Flash Memory, or the like). The mobile device 116 includes an operating system 210, such as the WINDOWS MOBILE 6 operating system, or another operating system, which is resident in the memory 204 and executes on the processor 202.

The keypad 208 may be a push button numeric dialing pad (such as on a typical telephone), a multi-key keyboard (such as a conventional keyboard). The display 206 may be a liquid crystal display, or any other type of display commonly used in mobile devices. The display 206 may be touch-sensitive, and may act as an input device.

One or more native application programs 212 may be loaded into the memory 204 and run on the operating system 210. The mobile device 116 may also include a non-volatile storage within memory 204. The non-volatile storage may be used to store persistent information which should not be lost if mobile device 116 is powered down.

The mobile device 116 includes a power supply 216, which may be implemented as one or more batteries. The power supply 216 might further include an external power source, such as an AC adapter or a powered docking cradle that supplements or recharges the batteries.

Mobile device 116 is shown with two types of optional external notification mechanisms: an LED 218 and an audio interface 222. These devices may be directly coupled to the power supply 216 so that when activated, they remain on for a duration dictated by a notification mechanism even though the processor 202 and other components might shut down to conserve battery power. The audio interface 222 is used to provide audible signals to and receive audible signals from the user. For example, the audio interface 222 may be coupled to a speaker for providing audible output and to a microphone for receiving audible input, such as to facilitate a telephone conversation.

Mobile device 116 also includes communications connection(s) 220, such as a wireless interface layer, that performs the function of transmitting and receiving communications, or a wired interface, such as a USB connection between the mobile device 116 and another computing device. The communications connection(s) 220 facilitates wireless connectivity between the mobile device 116 and the outside world. The communication connection 220 may be configured to connect to any type of wireless network. According to one implementation, transmissions to and from the communications connection(s) 220 are conducted under control of the operating system 210.

The mobile device 116 may include a camera 224 as an input device. The camera 224 may be activated through an action on the keypad 208 or touch-sensitive display 206. The camera 224 may include a multi-megapixel charge-coupled display (CCD) imaging device. Pictures or video taken by the camera may be stored in the memory 204.

The mobile device 116 may include a GPS receiver 226 that receives signals from one or more GPS satellites 122. By locating several GPS satellites 122, the GPS receiver 226 may determine the distance to each satellite and use this information to deduce the location of the mobile device 116. This operation is based on a mathematical principle called trilateration. If the mobile device 116 does not include a GPS receiver 226, other methods of trilateration may be used by determining radio signal strengths from ground based LBS tower(s) 120 or using information from the network 118.

A Java Platform, Micro Edition (JAVA ME) environment 214 provides an environment for Java-based applications to run on the mobile device 116. The mobile device 116 may include an Application Management Software (AMS) component running on top of the operating system 210 that is a software component that manages the downloading and life cycle of MIDlet applications. A MIDlet is a Java program designed for a JAVA ME virtual machine and operates as a content handler in the JAVA ME environment 114. The mobile device 116 may include a Mobile Information Device Profile (MIDP) that is a set of Java APIs that provides a complete JAVA ME application runtime environment in which the MIDlet applications may run. The MIDP provides a substantially complete Java runtime environment that leverages the capabilities of the mobile device 116. In this manner, the MIDP is able to offer functionalities used by mobile applications (e.g., the user interface, network connectivity, local data storage, and application management, etc.). A CLDC/CLC component provides for configuration of the Java runtime environment.

In the environment of the mobile device 116, the MIDlet applications are typically JAR files that are located and downloaded by the AMS. As the JAR files are installed, a list of installed MIDlet applications is maintained by the AMS. A JAVA ME Content Handler API (CHAPI) provides for integration of JAVA ME applications into the mobile device's application environment. The CHAPI manages the action to handle Uniform Resource Identifiers (URI) based on a MIME-type or other scheme. The CHAPI includes mechanisms for invoking a content handler, receiving responses, registering and unregistering content handlers and looking up installed handlers. The CHAPI may also provide the capabilities for browsers and native applications as well as JAVA ME applications to invoke other JAVA ME applications.

In some implementations, a particular MIDlet application may be provided as a severe weather application that may be launched by the AMS by user action (e.g., selecting one from a list) or by a call made to the AMS by another application requesting the capabilities of a particular MIDlet application. The severe weather application may also be a native application 212 installed on the mobile device 116. The severe weather application may perform many functions on the mobile device 116. For example, the severe weather application may be a network-aware application residing on the mobile device 116 that periodically reports the location of mobile device 114 to the mobile device location database 106 based on information ascertained from the GPS satellite 122 or LBS tower 120. The application may report the location of the mobile device every 15 minutes or more or less often in accordance with movement of mobile device 116. In some implementations, the application may report the location of the mobile device 116 on an ad hoc basis.

The application may also trigger upon receipt of SMS messages communicated by the SMS messaging server 108 to the mobile device 116. The application may use information within the SMS message, such as a short code to determine if the SMS message was communicated to the mobile device 116 by the service provider 102. If so, the application may examine the content within the SMS message to ascertain additional information, such as a severity code, from which a determination may be made to convert the text within the SMS message into a multimedia file (e.g. audio and/or video) for playback by the application on the mobile device 116. The conversion may be performed locally on the mobile device 116 or as a request from the mobile device 116 to the VoiceXML text-to-speech server 110. Further details of this operation are described below.

Figure 3A:
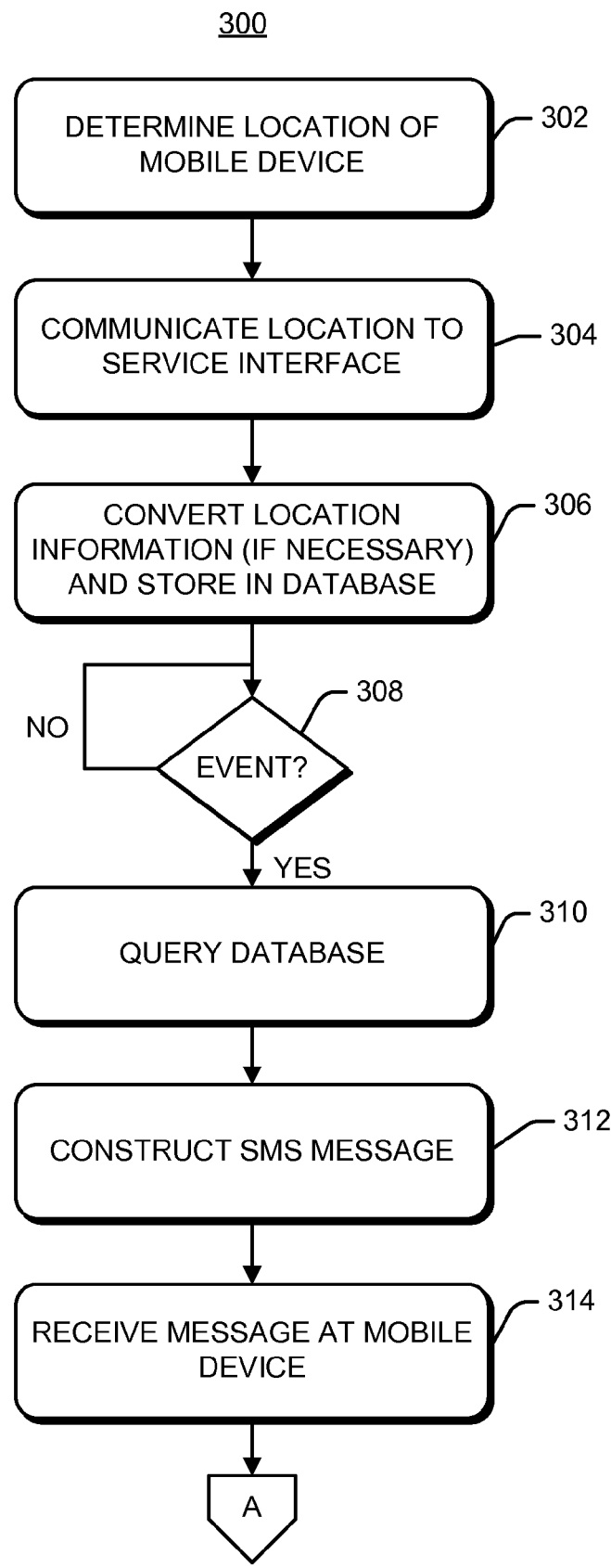

FIGS. 3A and 3B are operational flow charts depicting an exemplary processes 300 performed within the environment 100. At 302, a location of the mobile device is determined. The location of the mobile device may be obtained using either Global Positioning Satellites (GPS) 122 or ground-based location based service (LBS) towers 120 implemented by the network service carrier. As such, the mobile device 116 may obtain a latitude and longitude coordinate pair describing the position of the mobile device 116 with respect to the Earth.

At 304, the determined location may be communicated to the mobile web services interface. This may be performed by the application running on the mobile device 116. The mobile Web services interface 104 may then pass that information to the mobile device location database 106.

At 306, the mobile device location database 106 may convert the latitude/longitude coordinates to a state and county identifier, which is then correlated to a unique identifier of the mobile device 116 and stored in the mobile device location database 106. As such, the mobile device location database 106 may track the mobile device 116 at a county/state level. It is noted that other granularities may be implemented by the mobile device location database 106. For example, in some implementations, the mobile device may be tracked at a ZIP code level. etc.

At 308, it is determined if an event has occurred. Information may be received from external data sources 124 that are relevant to the mobile web services provided by the service provider 102. For example, severe weather alert associate with a particular county and state may be communicated from the National Weather Service (e.g. one of the external data sources 124) to the service provider 102. If no such events have been received at 308 process loops to wait for an event.

However, if an event is received at 308, then at 310, the mobile device location database may be queried to determine which mobile devices are within the geographic area associated with the event. For example, if the event is a Winter Storm Warning associated with Ruby Mountains/East Humboldt Range, Nev., the mobile devices 116 determined to be near Ruby Mountains/East Humboldt Range, Nev. may be retrieved from the mobile device location database 116.

At 312, an SMS message may be constructed to be communicated to phone numbers associated with the mobile devices 116 determined to be in the geographic area at 310. For example, the SMS message may be constructed at the SMS messaging server 108, as follows:

TWC_SWA_ID=12743;SEV=1=1/1
Winter Storm Warning for Ruby Mountains/east Humboldt Range, NV
A WINTER STORM WARNING REMAINS IN EFFECT FROM 7 PM THIS EVENING TO 7 PM PDT WEDNESDAY.
SNOW WILL BEGIN IN THE NEXT FEW HOURS OVER THE RUBY MOUNTAINS AND BECOME VERY HEAVY AT TIMES THROUGH TONIGHT. SNOW ACCUMULATIONS OF 1 TO 2 FEET ARE EXPECTED IN THE RUBY MOUNTAINS AND EAST HUMBOLDT RANGE . . . WITH LOCALIZED SNOW ACCUMULATIONS AROUND 3 FEET POSSIBLE BY LATE WEDNESDAY NIGHT.

The message may then be forwarded to the mobile device 116 using the network carrier's SMS gateway 112.

In some implementations, 310-312 may be omitted as the application on the mobile device 116 may query and/or send requests to the service provider 102 to determine if any events are relevant to the location of the mobile device 116. In response, an SMS-like message may be communicated to the mobile device 116 for examination by the application.

At 314, the application running on the mobile device 116 is triggered and receives the SMS message to determine if the message meets one or more predetermined thresholds at 316. For example, the severe weather application may determine if the short code in the SMS message identifies the service provider 102 as a primary threshold (e.g., TWC_SWA_ID=12743). If not, the message is ignored and passed on to the mobile device 116 for processing by another application. In some implementations, a secondary threshold may be examined, such as a severity associated with the message (SEV=1). The severity may range from 0-2, where 0 is informational, 1 is property threatening, and 2 is life threatening. If the severity (or short code) meets the secondary (or primary) threshold, the information from the message is extracted at 320, as it indicates a severe weather alert (service provider) message.

At 322, it is determined if the mobile device has the capability to convert information contained within the SMS message to a multimedia format. If so, then at 328 the multimedia content is rendered on the device from the content of the SMS message. For example, at 330 the text of the SMS message above may be converted into an audio file and played on the mobile device 116. The audio file may emulate a weather alert by playing three beep tones and then a voice message of the alert. In some implementations, the severe weather text may also be rendered on the user interface of the mobile device. In some implementations, the message may be replayed until the user acknowledges or cancels the message. In some implementations, the playback of the message may end when the alert expires.

If at 322, the mobile device does not have the capability to convert the information contained within the SMS message to the multimedia format, then at 324, a request is made by the mobile device 116 to the service provider 102. The request may contain VoiceXML formatted data containing the text content within the SMS message. The VoiceXML data may then be provided to the VoiceXML text-to-speech server 110 for conversion to an audio file or other multimedia file format at 326. The audio file or multimedia file format may then be communicated to the mobile device 116, where it is played on the mobile device 116 at 330, as noted above.

Some applications, a service provider 102 may track which events have been passed as messages to the mobile device 116. For example, a sequence number and a date stamp may be associated with each SMS message and each mobile device 116 tracked in the mobile device location database 106. Sequence numbers may be stored in a series of sequence servers (not shown) by the service provider 102. As such, the service provider 102 may resend messages if they are not acknowledged by the mobile device 116. Alternatively or additionally, service provider 102 may prevent the sending of duplicate messages to the mobile device 116 by associating the sequence number and date stamp to the messages and mobile devices 116.

In some implementations, environment 100 may be used to determine health and status of a cellular network. For example, if a large population of mobile devices 116 do not acknowledge messages sent by the service provider 102, it is likely that one or more cell towers 114 may be out of service and in need of repair. This information may be provided to the cellular network provider.

In some implementations, the event at 308 may be an "all clear" that follows a severe weather message or other message. In this way, users of the mobile devices 116 may be notified when conditions have returned to substantially normal or safe conditions.

Figure 4:
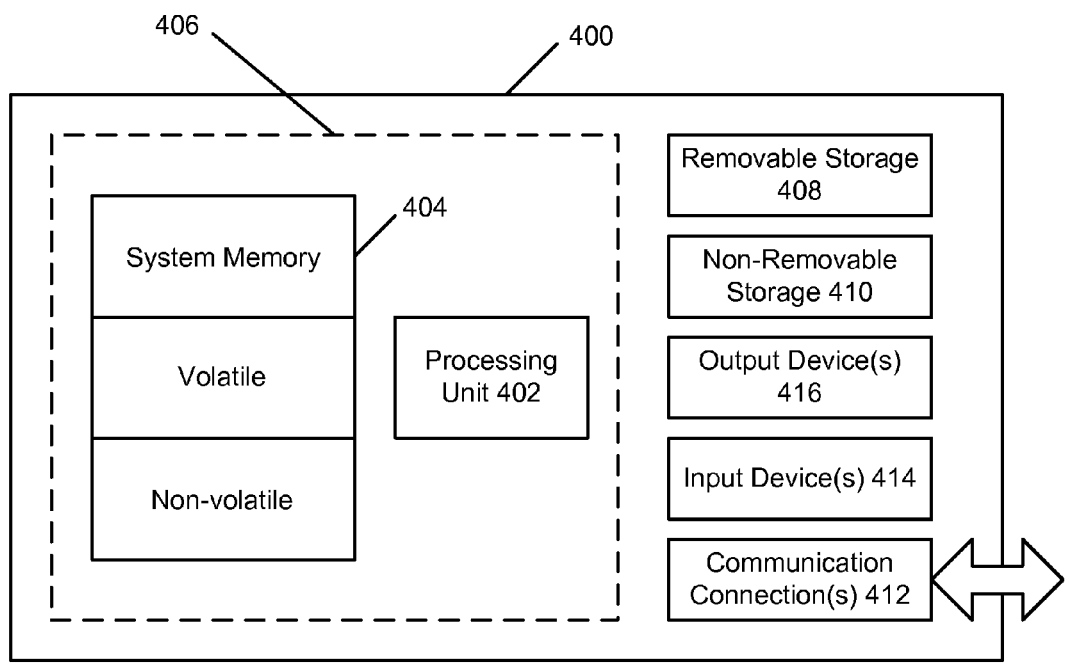
FIG. 4 illustrates an example system for implementing aspects of implementations of the disclosure.

With reference to FIG. 4, an example system for implementing aspects described herein may include a computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

What is claimed:

1. A method of providing a location-based multimedia message to a mobile device, comprising:
    storing a geographic location identifier and a unique identifier for the mobile device in a location database, the geographic location identifier being converted from geographic coordinate data for the mobile device;
    receiving information related to a geographic location at a mobile web services interface from an external source, the information having a geographic identifier;
    querying the location database for mobile devices within the geographic location associated with the geographic identifier of the information, the mobile devices within the geographic location having geographic location identifiers near the geographic identifier of the information;
    formatting the information in a Short Message Service (SMS) message, the SMS message having a short code containing an indicator that is compared to a threshold to determine whether to convert the SMS message to a multimedia file playable at the mobile device; and
    communicating, from a messaging server, the SMS message to the mobile devices in the geographic location.

2. The method of claim 1, further comprising converting the SMS message to the multimedia file playable at the mobile device.

3. The method of claim 2, further comprising determining if the mobile device has a capability to convert the information contained within the SMS message to a multimedia format.

4. The method of claim 3, further comprising:
    formatting the SMS message into a request at the mobile device;
    communicating the request to a service provider to convert the SMS message into the multimedia file; and
    communicating the multimedia file from the service provider to the mobile device.

5. The method of claim 1, further comprising:
    determining if a service provider of the location-based multimedia message is included within the short code; and
    comparing the service provider to the threshold.

6. The method of claim 5, further comprising passing the SMS message to a conventional messaging application on the mobile device if the threshold is not met.

7. The method of claim 1, further comprising examining the short code for an indicator of a severity associated with the information.

8. The method of claim 1, further comprising:
    converting a latitude and longitude coordinate pair of the mobile device to a state and county identifier, the state and county identifier being the geographic location identifier.

9. The method of claim 1, further comprising receiving a notification of the information from the external data source, wherein the information is related to a weather event.

10. The method of claim 1, further comprising:
    emulating a weather alert by playing beep tones and a voice message of the alert; and
    ending playback of the location-based multimedia message when the weather alert expires.

11. A method of providing a multimedia message on a mobile device, comprising:
    instantiating an application on the mobile device that provides geographic location information to a service provider for storage in a location database, the geographic location information comprising a geographic location identifier and a unique identifier, the geographic location identifier being converted from geographic coordinate data for the mobile device;
    receiving a Short Message Service (SMS) message containing location-based information targeted to mobile devices in a particular geographic region, the mobile devices in the particular geographic region having geographic location identifiers near a geographic identifier of the location-based information;

examining the SMS message to determine if a short code meets a predetermined threshold;

in response to determining that the short code meets the predetermined threshold, converting the SMS message to the multimedia message; and providing, at the mobile device, the location-based information in the SMS message as the multimedia message.

12. The method of claim 11, wherein converting the SMS message to the multimedia message further comprises:

formatting the SMS message into a request at the mobile device;

communicating the request to the service provider to convert the SMS message into a multimedia file; and receiving the multimedia file from the service provider at the mobile device.

13. The method of claim 11, further comprising:

determining if the service provider of the location-based information is included within the short code; and comparing the service provider to the predetermined threshold.

14. The method of claim 13, further comprising passing the SMS message to a conventional messaging application of the mobile device if the threshold is not met.

15. The method of claim 11, further comprising:

emulating a weather alert by playing beep tones and a voice message of the alert; and ending playback of the location-based multimedia message when the weather alert expires.

16. The method of claim 11, wherein converting the SMS message to the multimedia message further comprises converting, at the mobile device, the SMS message to a multimedia file.

17. A system for providing a location-based multimedia message to mobile devices, comprising:

a tracking database that maintains a geographic location identifier and a unique identifier of each of the mobile devices, the geographic location identifier being converted from geographic coordinate data for each of the mobile devices;

an interface to receive information related to a geographic location from an external provider, the information having a geographic identifier;

a Short Message Service (SMS) message server for querying the tracking database and communicating the information to mobile devices within a geographic region to which the information pertains, the mobile devices within the geographic region having geographic location identifiers near the geographic identifier of the information; and a multimedia server to convert the information to a multimedia format for a group of the mobile devices that lack a multimedia conversion functionality, wherein an SMS message is formatted with a short code to identify a service provider, wherein the short code is compared to a threshold to determine whether to convert the SMS message to the multimedia format, and wherein the information in the SMS message is provided as a multimedia message on the mobile devices.

18. The system of claim 17, wherein the information is related to a weather event and wherein the multimedia message emulates a weather alert by playing beep tones and a voice message of the alert.

* * * * *